March 26, 1957 — J. J. ROBBINS ET AL — 2,786,430
FOOD MAKING MACHINE
Filed Nov. 28, 1955 — 2 Sheets-Sheet 1

March 26, 1957 J. J. ROBBINS ET AL 2,786,430
FOOD MAKING MACHINE
Filed Nov. 28, 1955
2 Sheets-Sheet 2
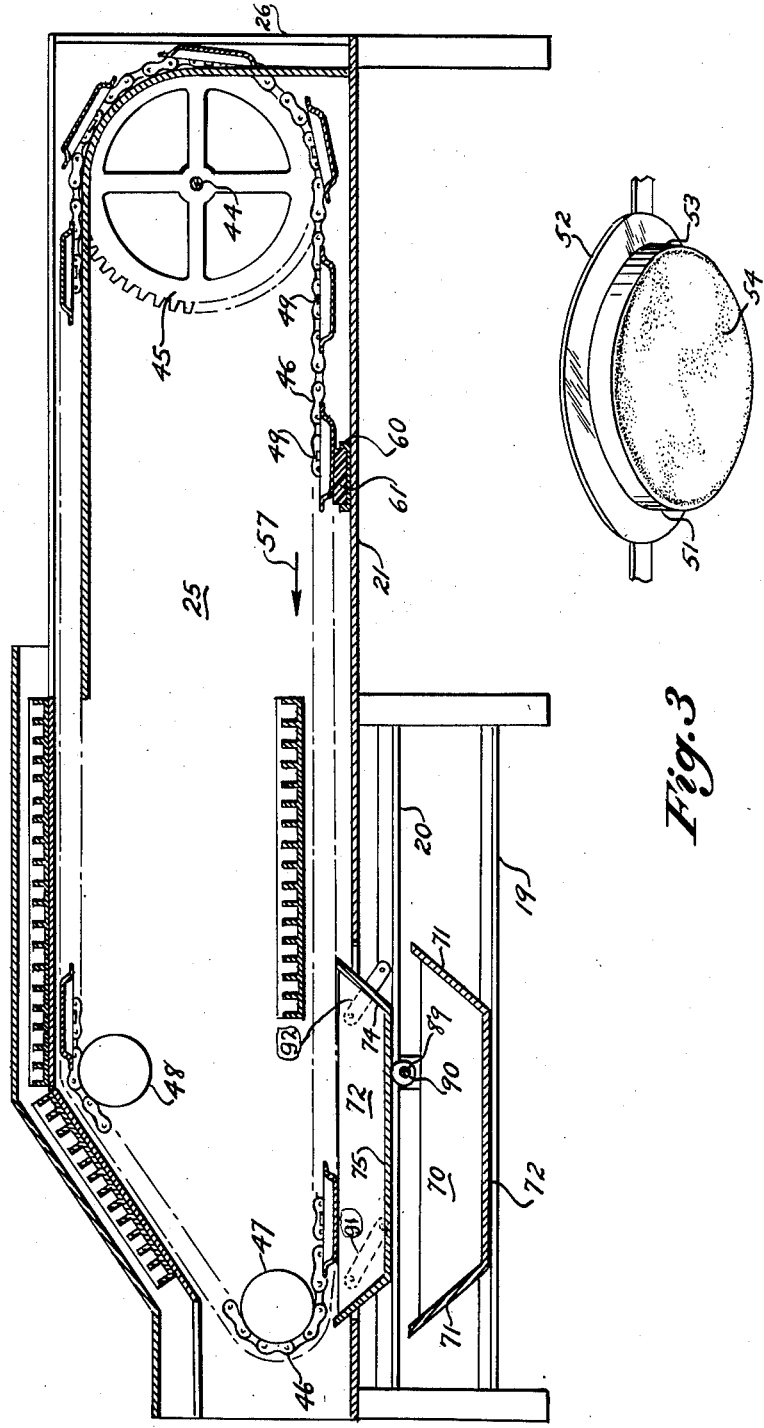

United States Patent Office 2,786,430
Patented Mar. 26, 1957

2,786,430

FOOD MAKING MACHINE

Joseph J. Robbins, Brooklyn, and Benjamin Grable, Herbert I. Horowitz, and Mendel Schuh, New York, N. Y.

Application November 28, 1955, Serial No. 549,453

2 Claims. (Cl. 107—58)

This invention relates generally to the field of food making devices, and more particularly to an improved machine for forming and baking small baked articles, as for example, wrappers or jackets of partially baked dough used in enclosing fillers of cheese, berries, and the like. The inventive structure is ideally suited for the manufacture of blintzes and similar food products.

Prior art devices used for similar purposes have suffered from a number of disadvantages, including the necessity of cutting structures adapted to sever small portions of dough after the same have been formed, and have not been able to produce wrappers or jackets of all desired shapes owing to the fact that the connected edges will produce only rectangular pieces. Moreover, difficulty has been encountered in maintaining the dough or coating of batter to a uniform thinness so that the finished product possesses the required consistency.

It is therefore among the principal objects of the present invention to provide improved food making structure of the class described, in which the above-mentioned disadvantages have been substantially eliminated.

Another object of the invention lies in the provision of an improved food making device which may have a relatively few number of moving parts, thereby permitting a relatively long, trouble-free useful life with a minimum of servicing.

A further object of the invention lies in the provision of a blintz wrapper forming and baking machine, in which the cost of fabrication may be of a relatively low order, with consequent wide sale and use in the trade.

A further object of the invention lies in the provision of a food making device which may be substantially automatic in operation, requiring only minor attendance on the part of the operator.

A feature of the invention lies in the provision of automatic maintenance of uniform battery supply, wherein a uniform thinness of baked product is obtained.

Another feature of the device lies in the fact that products of varying shapes may be obtained, depending upon the particular type of baked wrapper desired.

These objects and features, as well as other incidental ends and advantages, will become more clearly apparent during the course of the following disclosure, and be pointed out in the appended claims.

On the drawings, to which reference will be made in the specification, similar reference characters have been employed to designate corresponding parts throughout the several views.

Figure 2 is a vertical central longitudinal sectional view as seen from the plane 2—2 on Figure 1.

Figure 3 is a view in perspective showing one of the individual baking pans which comprise a part of the conveyor element of the embodiment.

Figure 1:
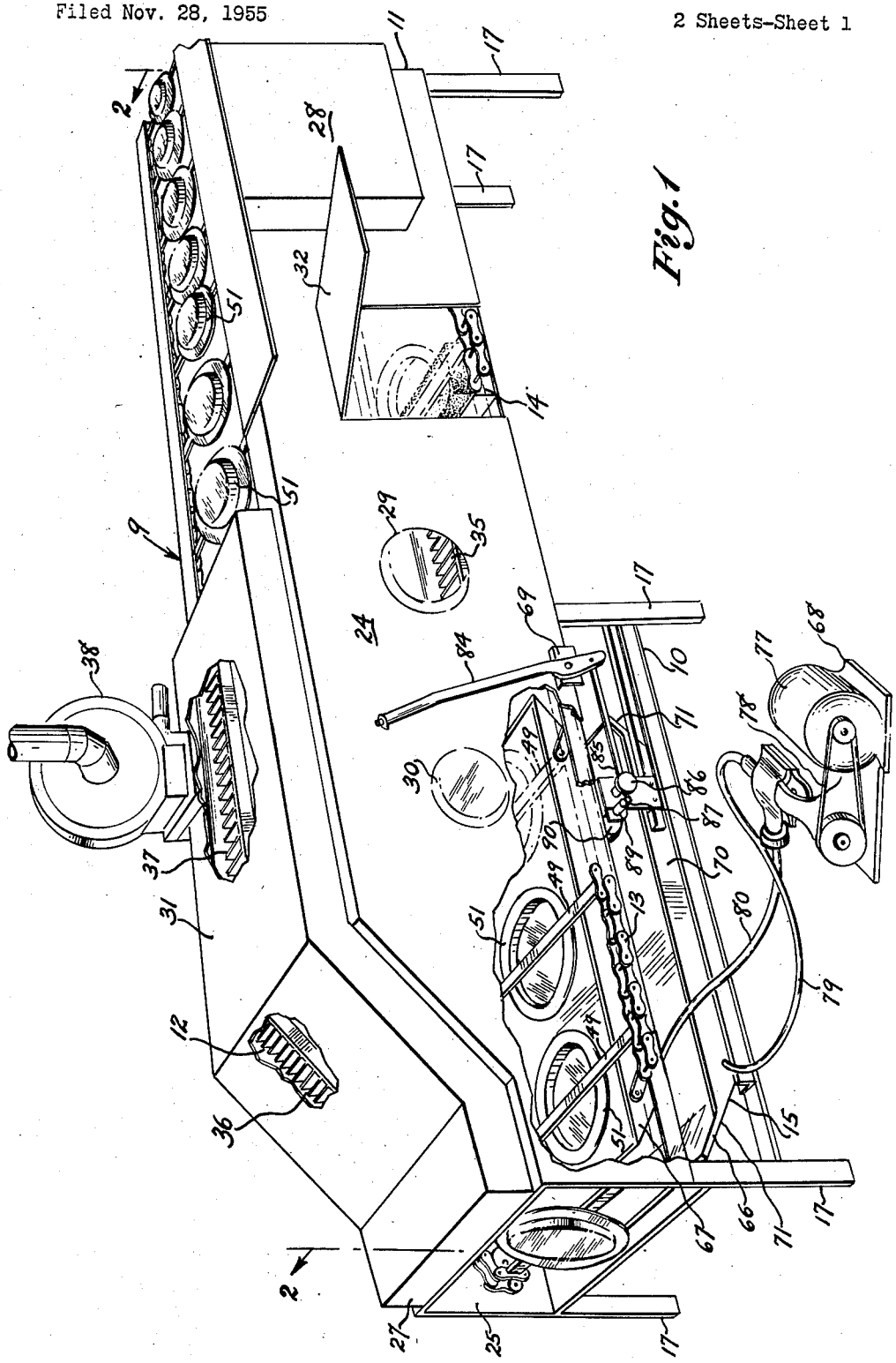
Figure 1 is a fragmentary view in perspective, partially broken away to show details of an embodiment of the invention.

In accordance with the invention, the device, generally indicated by reference character 9, comprises broadly: a frame element 10, a casing element 11, a baking element 12, a conveyor element 13, a greasing element 14 and a batter supply element 15.

The frame element 10 may be of any suitable type, as for example, that shown on Figures 1 and 2 wherein welded angle iron is employed. The element includes a plurality of leg members 17 adapted to support the device above a floor or other horizontal surface, as well as first, second and third horizontally disposed support members 19, 20 and 21, respectively. The support members 19–21, inclusive, may be of framework, or in the form of solid planar members.

The casing element 11 is adapted to completely enclose the moving parts of the device, and may be of sheet metal having a suitable refractory lining (not shown) at those parts which enclose the baking element 12. The casing element 11 includes a left side member 24, a right side member 25, end walls 26 and 27, and a motor housing 28. A plurality of windows 29 and 30 are positioned within the member 24 to permit inspection by the operator, as is a door 32 which permits access to the greasing element 14. A partial top wall 31 covers the baking element 12, thereby preventing an excessive heat loss and shielding the operator from direct heat.

The baking element 12 may be of any suitable type, and in the preferred form includes a preheater member 35, and first and second baking sections 36 and 37, respectively. A centrifugal air blower 38 supplies the necessary air to the gas fed jets of the members 35–37, inclusive which are preferably of a conventional type employed in commercial baking installations, in which individual gas jets (not shown) are separated by ceramic heat retaining members. The outlet duct of said blower shown at the bottom thereof of Figure 1 is connected to the various jets in a well known manner to promote combustion of the gaseous fuel supplied thereto. The heat from the jets is radiated first to pre-heat the interior of the baking pans 51 and then to their batter-coated bottoms during their travel in the direction indicated by the arrow 57 on Figure 2.

The conveyor element 13 includes a geared prime mover such as a motor (not shown) disposed within the motor housing 28, the same driving a shaft 44 upon which driven sprocket members 45 are mounted for axial rotation. Sprocket chains 46 pass about the members 45 and idler pulleys 47 and 48 (see Figure 2). At uniformly spaced intervals, the chains 46 are interconnected by support bars 49 which are mounted upon individual links of the sprocket chains in well known manner. Each of the support bars has welded thereon a baking pan 51, the baking pans including a rim portion 52, a dished side wall portion 53 and a bottom portion 54 (see Figure 3). When energized, the prime mover causes the chains 46 to move in the direction indicated by the arrow 57, wherein the individual pans 51 move successively past the greasing element 14, the preheater 35 of the baking element 12, the batter supply element 15, and the baking sections 36 and 37, to emerge from beneath the right hand terminal edge of the top wall 31, where the baked product may be manually removed, or allowed to fall from the individual pans 51, as the same reverse direction to again contact the greasing element 14.

The greasing element 14 includes a cup-shaped reservoir member 60, in which there is disposed a sponge member 61, preferably of a cellulose type. The supply of grease or cooking oil may be periodically replenished by the operator by refilling the reservoir member 60 as required. As may be seen on Figure 2, the level of the sponge member 61 is maintained such that it will contact only the outer surface of the bottom portion 54, of successive individual baking pans 51.

The batter supply element 15 includes a lower or supply batter pan 66, an upper or coating pan 67, pump means 68, and pan elevating means 69.

The lower or supply pan 66 serves as a relatively large reservoir for batter and may be slid leftwardly, as seen on Figure 1, to facilitate filling. It includes side walls 70, inclined end walls 71, and a bottom wall 72, which rests upon the first support members 19. The upper or coating pan 67 is of generally similar configuration, although appreciably smaller in capacity. It includes side walls 72, end walls 74, and a bottom wall 75, normally supported by the second support members 20.

The pump means 68 may be of a centrifugal type driven from a prime mover such as motor 77 through belt means 78. Hose lines 79 and 80 are interconnected with the pans 66 and 67, respectively, immediately above the bottom walls 72 and 75. During operation, the pump runs constantly, moving liquid batter from the lower pan 66 to the upper pan 67 at a rate sufficient to cause the upper pan 67 to constantly overflow, whereby the excess batter falls to the lower pan 66.

The elevating means 69 includes a lever member 84, which transmits motion through rack 85 supported by bearing 87 to a gear (not shown) of outer diameter equal to that of shaft 89 and mounted upon shaft 89, to a pair of cams one of which is shown at 90 mounted on shaft 89, which bear against the lower surface of the upper pan 67. The shaft 89 is mounted for rotation about a fixed horizontal axis upon the frame element 10. Adjusting wheel 86 serves to raise or lower shaft 89 to position the cams 90 for initial adjustment, following which lever member 84 rotates the shaft 89. If desired, other shaft rotating means (not shown) may be substituted. As may be seen on Figure 2, the upper pan is mounted on parallel link members 91 and 92, so that upon movement of the cams 90, the upper pan 67 may be moved into the path of movement of the baking pans 51. Proper adjustment of the uppermost level of the upper pan is such that the outer surface 55 of each successive pan 51 will just clear the end walls 74, and skim the surface of the overflowing batter (not shown) wherein the greased outer surface 55 may pick up a thin film of the same.

During operation, each successive pan 51 moves in a leftward direction as seen on Figure 2 to first pick up a film of grease from the element 14, after which the pans are preheated by member 35 before acquiring a coating of batter upon the surface 55. Upon passing the idler pulley 47, the pans are subjected to the heat emanating from the baking sections 36 and 37, and upon leaving section 37, the pans, together with the attached baked product, are allowed to cool. By the time the upper part of the sprocket members 45 are reached, the baked product may be manually lifted from contact with the pan 51, or allowed to fall under the action of gravity as the pan is tilted in passing about the sprocket member.

It may thus be seen that I have invented novel and highly useful improvements in a food making construction, in which individual baked articles of thin consistency may be formed and baked at a relatively high rate. By varying the shapes of the outer surfaces of the baking pans, it is possible to form and bake articles of relatively intricate shape without additional complication. The device may be operated by those possessing only ordinary skill, and owing to the simplicity of the component parts, servicing operations may be performed without difficulty.

We wish it to be understood that we do not consider the invention limited to the exact details of structure shown and set forth in this specification, for obvious modifications will occur to those skilled in the art to which the invention relates.

We claim:

1. A food making device comprising: a conveyor element; a baking element, and a batter supply element; said conveyor element including a plurality of cup-shaped baking pans having an exposed surface, and means to move said pans past said batter supply and baking element; said batter supply element including a batter supply pan containing batter and movable into the path of movement of said baking pans, wherein a portion of each of said baking pans may be coated with batter upon said exposed surface upon movement past said batter supply element, said baking element being positioned so as to subject said baking pans to heat after movement past said batter supply element; and means to maintain a constant level of batter within said batter supply pan; said last named means including a second batter supply pan disposed beneath said first-mentioned pan and pump means for moving batter from said second pan to said first-mentioned pan.

2. A food making device comprising: a conveyor element, a baking element, and a batter supply element; said conveyor element including a plurality of cup-shaped baking pans having an exposed surface, and means to move said pans past said batter supply and baking element; said batter supply element including a batter supply pan containing batter and movable into the path of movement of said baking pans, wherein a portion of each of said baking pans may be coated with batter upon said exposed surface upon movement past said batter supply element; said baking element being positioned so as to subject said pans to heat after movement past said batter supply element; means to maintain a constant level of batter within said batter supply pan; said last named means including a second batter supply pan disposed beneath said first-mentioned pan and pump means for moving batter from said second pan to said first-mentioned pan and means for greasing the exposed surface of said baking pans prior to contact with said batter.

References Cited in the file of this patent
UNITED STATES PATENTS 1,781,411      Reiber _____ Nov. 11, 1930